UNITED STATES PATENT OFFICE.

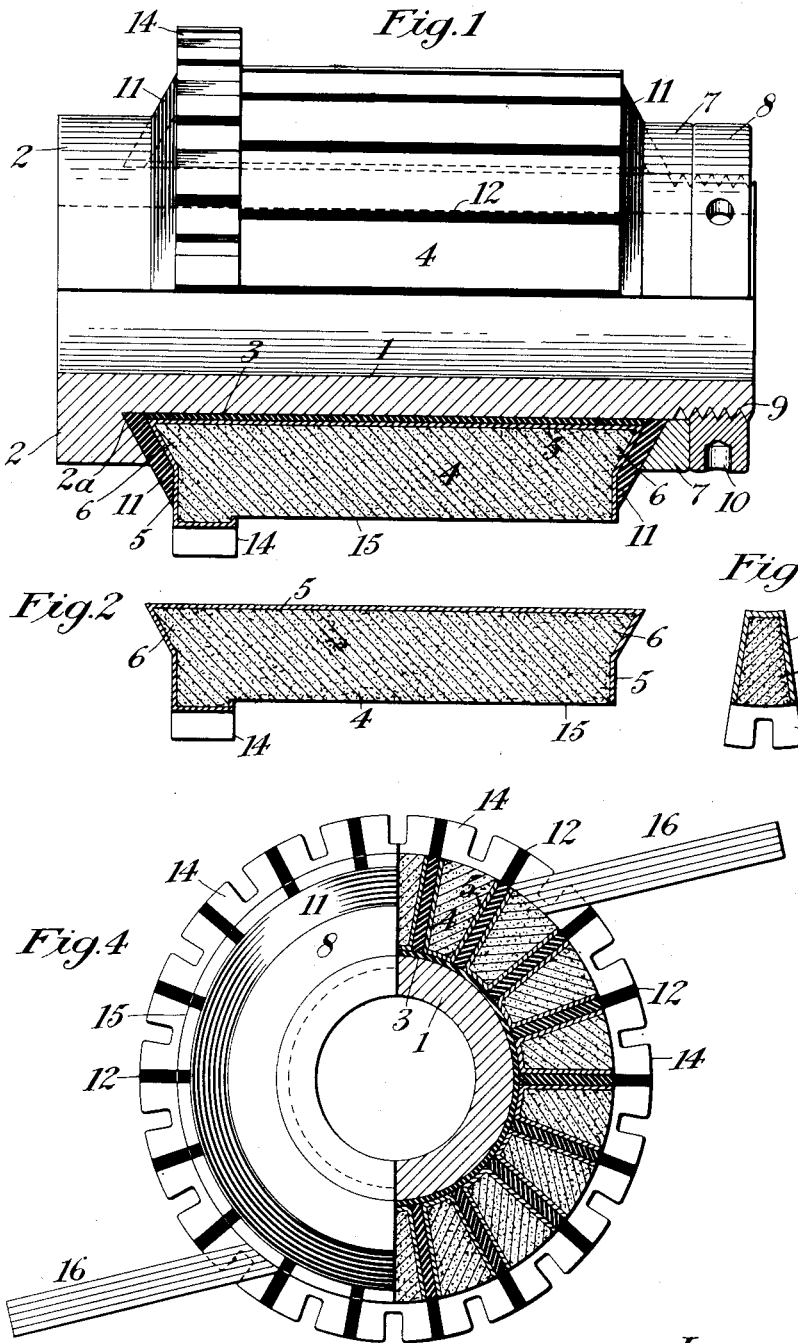

CLARENCE W. COLEMAN, OF WESTFIELD, NEW JERSEY, ASSIGNOR TO THE HALL SIGNAL COMPANY, A CORPORATION OF MAINE.

COMMUTATOR.

No. 866,262.      Specification of Letters Patent.      Patented Sept. 17, 1907.

Application filed January 24, 1907. Serial No. 353,815.

*To all whom it may concern:*

Be it known that I, CLARENCE W. COLEMAN, a citizen of the United States, residing at Westfield, in the county of Union and State of New Jersey, have invented certain new and useful Improvements in Commutators, of which the following is a specification, reference being had therein to the accompanying drawings, forming a part thereof.

My invention relates to commutators for electric machines.

One of the objects of my invention is the prevention of the collection of moisture and formation of frost and ice on the current conveying contact surfaces of such devices when used in out-of-door locations, as in signal boxes of electric railway signaling apparatus.

I have found in practice that the commutators of the electric motors of motor operated signals, although shielded from direct exposure to the elements by inclosure in signal boxes, are liable to become coated with moisture and frost or ice particularly during those seasons of the year when rapid changes of temperature occur above and below the freezing point of water. The inclosed air within the box or casing does not as quickly change its temperature as the outer air. Therefore after a day in which the temperature has been above the freezing point, a night may follow in which the temperature of the outer air is considerably below the freezing point. The air within the signal box will contain dissolved within it a substantial amount of water even in dry weather, and in wet weather will contain a considerable amount of dissolved water. The lower temperature of the outer air will quickly chill the casing and all metallic parts, by reason of their high conductivity, and all metallic parts will be at a much lower temperature than the air within the signal box, and in consequence thereof will condense and freeze the water from the air in contact with them. The electromotor and its commutator are at rest for comparatively long intervals of time, and there is ample opportunity for the formation of a substantial coating of frost or ice. The metallic commutators heretofore used have acted effectively in thus condensing and freezing water with the result that they have been coated with an insulated covering of frost or ice, effectually preventing the operation of the signal until this coating of frost or ice has been either scraped or melted off. Efforts have been made by ventilation of the signal boxes to minimize this frost coating operation, but it is still a source of substantial annoyance and interference with traffic.

My invention includes the provision of a non-metallic current-carrying contact surface upon a commutator so that this current-carrying surface of the commutator by reason of its poor heat conducting qualities will not quickly respond to changes of temperature in the outer air and will not therefore, under the conditions above stated, act as a moisture condensing and freezing surface.

My invention includes more specifically the employment of carbon for such current-carrying contact surfaces; and the specific form of carbon which I prefer to employ is graphite, which is peculiarly advantageous because of its lubricative character. The use of carbon or other friable material in a commutator, although heretofore proposed, has been impracticable owing to the fact that such materials are easily broken when in the form of narrow bars such as are used in a commutator, and do not well resist the strains incident to assembling them and clamping them in the commutator structure. In the present invention the commutator bars of carbon or other friable material are coated, except on their contact surfaces, with a substantial thickness of metal, preferably copper owing to its high conductivity, this coating being preferably deposited electrically on the carbon to secure adhesion and intimate electrical contact, and in this way not only is the conductivity of the bars increased, but a substantial mechanical advantage is secured, the thin bars being so reinforced that they can be safely clamped under considerable longitudinal and lateral pressure between recessed clamping heads, as is usual in the construction of commutators with metal bars, and thus the peculiar advantages of the non-metallic contact surface are secured without any countervailing mechanical disadvantage.

My invention has other objects and advantages which will appear from the following description, and includes various improvements in construction, all of which will be fully described with reference to the accompanying drawings showing an embodiment of my invention.

I will now make such description and will thereafter point out my invention in claims.

Figure 1 is a side view, with the upper half in full and the lower half in section, of the complete commutator. Fig. 2 is a longitudinal central section of one of the commutator sections, detached. Fig. 3 is a transverse central section of the same. Fig. 4 is an end view, half in full and half in section, of a complete commutator and the commutator brushes.

The current-conductive portions of the commutator shown consist of the bars or sections 4 which are composed of graphite, with radial sides and arc shaped inner and outer surfaces and provided at their ends with inclined projections 6 coöperative with clamping heads for clamping them in place, and each provided at one end with a slotted outer projection or lug 14 in the slot of which the connecting wire may be secured. These sections are coated with copper preferably by electrolytic deposition so as to give them a metallic highly conductive surface and a surface to which the connecting wires may be soldered, this copper coating 5 originally covering the entire surface of the section. The rubbing surfaces or current-carrying contact surfaces are thereafter turned off in a lathe so as to remove the copper coating at these current-conveying contact surfaces and to leave a surface of graphite—a non-metallic surface. This latter operation is best performed after all the sections and parts have been assembled and clamped together.

The several commutator sections are assembled about a sleeve 1 having at one end an enlarged head 2 formed with an annular undercut recess $2^a$ to receive the inclined projections at the adjacent ends of the commutator sections and the intervening rings 11 of insulating material, preferably mica; and threaded at its other end to carry a nut 8, which clamps against an undercut ring 7 which again clamps against rings 11 of insulating material, such as mica, intervening between the undercut ring 7 and the inclined projections at the adjacent ends of the commutator sections. It is to be noted that before assembling the commutator sections a ring 3 of insulating material, such as mica, is placed over the cylindrical upper surface of the sleeve 1 so as to circumferentially insulate the commutator sections at their inner surfaces, and that radial insulating plates 12, which may also be of mica, and which have a configuration conforming to the entire side of a commutator section, are inserted between the sections as the sections are assembled.

After the several parts have been assembled and firmly clamped together the current-carrying contact surface of the commutator is turned down, as aforesaid, to remove the copper coating, and produce a smooth cylindrical surface 15 of graphite, with intervening insulating strips of mica. This current-carrying contact surface coöperates with metallic commutator brushes 16, which may be of the usual laminated form. With a metallic brush rubbing against its surface, the commutator will wear down smoothly and evenly so that its efficiency will be retained for a long period of use.

It is obvious that various modifications may be made in the construction shown and above particularly described within the principle and scope of my invention.

I claim:—

1. A commutator comprising contact bars insulated from each other on their adjacent surfaces and comprising non-metallic bodies coated with conductive metal on their lateral surfaces.

2. A commutator comprising contact bars of non-metallic material coated on their lateral surfaces with metal, and means for engaging the ends of the bars and clamping them in place under pressure.

In testimony whereof I have affixed my signature in presence of two witnesses.

CLARENCE W. COLEMAN.

Witnesses:
BERNARD COWEN,
WM. ASHLEY KELLY.